United States Patent
Brookins

(10) Patent No.: US 10,799,838 B1
(45) Date of Patent: Oct. 13, 2020

(54) MULTIFUNCTIONAL MISTING SYSTEM

(71) Applicant: Keith Donald Brookins, Miami, FL (US)

(72) Inventor: Keith Donald Brookins, Miami, FL (US)

(73) Assignee: ZAP MOSQUITO SOLUTIONS INC., Miami, FL (US)

( * ) Notice: Subject to any disclaimer, the term of this patent is extended or adjusted under 35 U.S.C. 154(b) by 0 days.

(21) Appl. No.: 16/839,624

(22) Filed: Apr. 3, 2020

Related U.S. Application Data

(63) Continuation-in-part of application No. 16/161,286, filed on Oct. 16, 2018.

(51) Int. Cl.
| | |
|---|---|
| *B01F 3/04* | (2006.01) |
| *B05B 11/00* | (2006.01) |
| *A01M 29/12* | (2011.01) |
| *A01M 7/00* | (2006.01) |

(52) U.S. Cl.
CPC ....... *B01F 3/04021* (2013.01); *A01M 7/0021* (2013.01); *A01M 29/12* (2013.01); *B01F 3/04049* (2013.01); *B05B 11/0008* (2013.01); *B05B 11/0037* (2013.01); *B05B 11/3087* (2013.01)

(58) Field of Classification Search
CPC ..... B01F 3/04; B01F 3/04021; B01F 3/04049
USPC .................................................. 261/76, 115
See application file for complete search history.

(56) References Cited

U.S. PATENT DOCUMENTS

| | | | |
|---|---|---|---|
| 7,090,147 B2 | 8/2006 | Lovett | |
| 7,320,439 B2 | 1/2008 | Davis et al. | |
| 7,540,433 B2 | 6/2009 | Fleming et al. | |
| 8,430,337 B2 | 4/2013 | Pearce, III et al. | |
| 8,994,529 B2 | 3/2015 | White | |
| 9,358,569 B2 | 6/2016 | Burt et al. | |
| 9,414,580 B2 | 8/2016 | Franks et al. | |
| 10,028,497 B1 | 7/2018 | Brookins | |
| 2008/0029614 A1 | 2/2008 | Dore | |
| 2008/0067263 A1 | 3/2008 | Modlin et al. | |
| 2009/0183689 A1 | 7/2009 | Moore et al. | |
| 2009/0265977 A1 | 10/2009 | Sullivan et al. | |
| 2012/0319309 A1* | 12/2012 | Sorola ................... | B01D 47/00 261/28 |
| 2019/0079480 A1* | 3/2019 | Sun ......................... | G06F 3/016 |

* cited by examiner

*Primary Examiner* — Robert A Hopkins
(74) *Attorney, Agent, or Firm* — Albert Bordas, P.A.

(57) ABSTRACT

A multifunctional misting system having a housing assembly, a frame assembly, a recessed mist blower assembly, a valve assembly, a recess control panel assembly, a pump-motor assembly, a tank assembly, a puck assembly, and a handle assembly. The housing assembly has first and second flat panels, a front panel, a rear panel, a top panel, a bottom panel, and locking corners. The frame assembly has a solenoid side frame and a blower side frame, a mix solenoid, and a battery with a battery retainer. The recessed mist blower assembly has a blower and nozzles. The pump-motor assembly has a pump motor, a pump housing and a motor-battery bracket. The handle assembly is positioned onto the top panel of the housing assembly. The multifunctional misting system may operate as a mist blower.

13 Claims, 17 Drawing Sheets

MULTIFUNCTIONAL MISTING SYSTEM

BACKGROUND OF THE INVENTION

1. Field of the Invention

The present invention relates to multifunctional misting systems, and more particularly to misting systems, portable mist blowing systems, portable misting wand systems, and fixed misting stations.

2. Other Related Applications

The present application is a continuation-in-part of pending U.S. patent application Ser. No. 16/161,286, filed on Oct. 16, 2018, which is hereby incorporated by reference.

3. Description of the Related Art

Applicant believes that one of the closest references corresponds to Applicant's own U.S. Pat. No. 10,028,497 issued to Keith Donald Brookins on Jul. 24, 2018 for Misting system. However, it differs from the present invention because Brookins teaches a misting system having an external compartment, an interior housing, a container housing, an electrical compartment, a lid assembly, and at least one outlet. The external compartment has a top face with a hole, a cavity, and an electrical cover panel. The interior housing has a top face with a hole, and lateral faces with a respective pivot hole. The container housing has lateral faces having pivoting protrusions, which are positioned onto each pivot hole of the interior housing lateral faces. The electrical compartment has a cover panel, a battery and a pump assembly. The lid assembly has a locking tab, a panel locking tab, a latching-limiter rod, and a spear. The electrical cover panel of the external compartment mounts onto the electrical compartment, and the cover panel of the electrical compartment mounts onto the external compartment. The lid assembly covers the external compartment and the electrical compartment.

Applicant believes that another reference corresponds to U.S. Patent Application Publication No. 2009/0265977, published on Oct. 29, 2009 to Helen Joyce Sullivan, et al. for Portable Insect Misting System. However, it differs from the present invention because Sullivan, et al. teach a portable, light-activated, mist sprayer system comprising a direct current power supply, a container of treating fluid at a desired concentration; a motor and a pump that is activated at the appropriate time as determined by the switch or timer; at least one sprayer nozzle that will dispense a mist containing the treating fluid whenever the pump is operating; and a timer that turns off the pump after a preset interval to terminate the spraying cycle. The system sprays dilute solutions of insecticide or insect repellent in a mobile fashion while in areas away from a power source or away from larger stored amounts of insecticides.

Applicant believes that another reference corresponds to U.S. Patent Application Publication No. 2009/0183689, published on Jul. 23, 2009 to Gary Stephen Moore, et al. for Portable, rechargeable insect control apparatus and method of operation. However, it differs from the present invention because Moore, et al. teach a system for controlling insects that include an insect control compound reservoir. A pump receives an insect control compound from the insect compound reservoir and pressurizes the insect control compound. A rechargeable battery provides power to the pump. A plurality of nozzles receives the pressurized insect control compound and generates an insect control compound mist. A controller receives a first command to cause the pump to begin operation and a wireless signal to cause the pump to stop operation.

Applicant believes that another reference corresponds to U.S. Patent Application Publication No. 2008/0067263, published on Mar. 20, 2008 to Kemper O'neal Modlin, et al. for Automated pest misting system with pump. However, it differs from the present invention because Modlin, et al. teach a system and method for controlling adult populations of flying pests. A self-contained reservoir system for automated misting of pesticides can be operated in remote location without the availability of line power or pressurized water. The automated spraying system comprises a secure controller unit with locking features, and a plurality of dispersing elements attached to the unit. Enclosed within the weatherproof and secure enclosure of the unit is a controller, a pump, a pesticide reservoir, and a power source for delivering controlled amounts of a pesticide mixture to the dispersing elements. The pump is capable of producing pressures sufficient for producing a mist from the dispersing elements. The pesticide reservoir holds pre-measured and premixed pesticide that can be used for direct treatment of an area. A misting schedule is entered into the controller or timer. At the predetermined misting times, the controller completes the circuit between the battery and pump, thereby energizing the pump and causing the pesticide mixture to be pumped into the dispersing elements. The unit may be fitted with safety and efficiency components that automatically discontinue the misting cycles if someone is present in the area, weather conditions are not optimal, a fault is detected, or pest activity is not favorable for a treatment.

Applicant believes that another reference corresponds to U.S. Patent Application Publication No. 2008/0029614, published on Feb. 7, 2008 to David James Dore for Mist-spraying apparatus. However, it differs from the present invention because Dore teaches a mist-spraying apparatus primarily but not exclusively for use in an enclosed space that includes an air-blowing mechanism, a spraying mechanism and, a control mechanism. The air-blowing mechanism defines an outlet conduit through which air can be blown and an inlet conduit through which air from within the space can be drawn. The spraying mechanism includes a pump for delivering liquid from a reservoir to an atomizing nozzle for spraying. The atomizing nozzle is located within the outlet conduit so that atomized particles emitted by the atomizing nozzle are entrained in the airstream emitted by the air-blowing mechanism and thereby distributed evenly throughout the space. The control mechanism controls operation and is adapted to commence operation of the air-blowing prior to operation of the atomizing nozzle and to continue operation of the air-blowing after operation of the nozzle has ceased.

Applicant believes that another reference corresponds to U.S. Pat. No. 9,414,580 issued to Barry, et al. on Aug. 16, 2016 for Heatless and cordless fogging/misting apparatus having a low CFM DC-powered blower motor and a mixing chamber for ultra-low volume atomized fog. However, it differs from the present invention because Barry, et al. teach a portable fogger apparatus that includes a portable fogger body having at least one airflow passageway. A DC blower motor is connected to the fogger body proximate to the airflow passageway and receives power from a battery, wherein the DC blower motor produces airflow through the passageway. A mixing chamber is positioned along the at least one passageway, wherein at least a portion of the airflow is movable through the mixing chamber. A quantity of pressurized fogging liquid is housed within a container connected to the logger body. The pressurized fogging liquid is dispensable from the container into the mixing chamber where it is expelled through a nozzle and mixed with the airflow to produce a fog. The fog has an atomized micron particulate size between 5 and 60 microns. An activation controls activation of the DC blower motor and/or dispensing of the pressurized fogging liquid.

Applicant believes that another reference corresponds to U.S. Pat. No. 9,358,569 issued to Burt, et al. on Jun. 7, 2016 for Ultrasonic surface treatment device and method. However, it differs from the present invention because Burt, et al. teach devices, which generate a mist of a treatment composition, and an aerosolized treatment composition, which imparts a technical benefit to surfaces, or airspaces, which come into contact with the aerosolized treatment composition.

Applicant believes that another reference corresponds to U.S. Pat. No. 8,994,529 issued to Jeffrey C. White on Mar. 31, 2015 for Mosquito misting system and method for using same. However, it differs from the present invention because White teaches an apparatus and method for controlling and monitoring a mosquito misting system. The apparatus includes a chemical reservoir, a delivery system, a spray system, one or more sensors, a communication network and a misting management unit. The sensors may detect normal and abnormal operations of the misting system and send this data to the misting management unit. The misting management unit may then analyze the data and determine the problem. If the problem can be fixed without personnel, the misting management unit may simply adjust the system and fix the problem. If the problem requires personnel, the system may automatically schedule the service call based on a number of criteria.

Applicant believes that another reference corresponds to U.S. Pat. No. 8,430,337 issued to Pearce, et al. on Apr. 30, 2013 for Light-activated portable aerosol mist sprayer device. However, it differs from the present invention because Pearce, et al. teach a portable, light-activated, mist sprayer system comprising direct current power supply, an ambient light sensor, electronic circuitry that evaluates an electrical signal received from the light sensor to determine whether a "dusk" or "dawn" light condition exists; a container of treating fluid at a desired concentration; a motor and pump that are activated at the appropriate time as determined by the sensed light condition; at least one sprayer nozzle that will dispense a mist containing the treating fluid whenever the pump is operating; and a timer that turns off the pump after a preset interval to terminate the spraying cycle. The system is spraying dilute solutions of insecticide or insect repellent during the periods of significant insect activity that typically occur around dusk and dawn.

Applicant believes that another reference corresponds to U.S. Pat. No. 7,540,433 issued to Fleming, et al. on Jun. 2, 2009 for Insect control system and method. However, it differs from the present invention because Fleming, et al. teach an automated insect control system, which utilizes a container tank, a canned pump, distribution system, and a programmable digital timer to allow a user to control the times per day and the duration in which to apply insecticide to an area. A remote control is provided which permits a user to commence and terminate spraying of insecticide as the need arises without resorting to reprogramming of the spraying schedule.

Applicant believes that another reference corresponds to U.S. Pat. No. 7,320,439 issued to Davis, et al. on Jan. 22, 2008 for Self-contained insect repelling and killing apparatus. However, it differs from the present invention because Davis, et al. teach an apparatus for the purpose of dispensing a chemical agent whose function is to detract or alternatively attract and destroy, insects, in particular, flying insects. The apparatus consists of a chemical source, a connection to a fluid source, usually water, a reservoir for chemical mixing and a pump for mixing and creating pressure. Mixing reservoir is of such size to eliminate any chance of chemical mixture separation and where the chemical mixture is agitated prior to each dispensing cycle. Fluid is disbursed under pressure through a series of atomizing devices, interconnected to the apparatus through a flexible plastic delivery conduit. The apparatus functions are controlled through the use of an electronic interface. Preferred agent used is pyrethrum based, naturally occurring or synthesized, which possesses an antagonistic effect toward targeted pests but apparatus is designed to be adaptable to a wide-range chemical.

Applicant believes that another reference corresponds to U.S. Pat. No. 7,090,147 issued to Rod Lovett on Aug. 15, 2006 for Mosquito misting system. However, it differs from the present invention because Lovett teaches a mosquito misting system having a liquid reservoir that is operably associated with a fluid pump and motor and fluid conduits to transmit a fluid insecticide to one or more dispersal nozzles. A controller is used to control the frequency and duration of dispersal. An agitator device is associated with the fluid reservoir to adequately agitate the insecticide mixture within the reservoir during or just prior to dispersal of the fluid insecticide. The controller is interconnected with a level sensor assembly to provide a graphic indication of the level of fluid insecticide remaining in the reservoir. Additionally, the misting system is provided with a fluid pressure switch that detects a rupture in the fluid conduit and prevents further flow of fluid from the reservoir. The system has remote control and, a remote monitoring feature that allows improved service and maintenance for the system.

Other patents describing the closest subject matter provide for a number of more or less complicated features that fail to solve the problem in an efficient and economical way. None of these patents suggest the novel features of the present invention.

SUMMARY OF THE INVENTION

The present invention is a multifunctional misting system, comprising a housing assembly, a frame assembly, a recessed mist blower assembly, a valve assembly, a recess control panel assembly, a pump-motor assembly, a tank assembly, a puck assembly, a handle assembly, and a controller/transmitter-receiver assembly.

The multifunctional misting system may further comprise a misting wand assembly, and a handheld remote control transmitter-receiver.

The multifunctional misting system may operate as a station misting system, a portable mist blowing system, or a portable misting wand system.

The housing assembly comprises first and second flat panels, a front panel, a rear panel, a top panel, a bottom panel, locking corners, and strap loops. The front panel comprises a blower panel hole, a control panel hole, and a valve threaded neck hole. The top panel comprises a tank neck hole.

The frame assembly comprises a solenoid side frame and a blower side frame. The solenoid side frame and the blower side frame each comprises a top wall, first and second lateral stiffeners, and a bottom panel attachment base. The frame assembly further comprises a battery, a battery retainer, and a mix solenoid having a mix tube.

The recessed mist blower assembly comprises a blower having a blower outlet and a blower inlet, a blower motor, first and second blower bases, a recess blower panel, a blower coupling shroud, a blower bezel, a blower shroud flapper, flapper hinge pins, and nozzles.

The valve assembly comprises a valve body, a threaded valve neck, and a valve selector handle. The valve assembly further comprises an adapting elbow, an adapting tee, an elbow adapter, an output tube, a quick connect, an intake tube, outlets, an inlet, a pressure switch, and an adapter for pressure switch.

The recess control panel assembly comprises a recess control panel, a control bezel, a mix switch, a lighted power switch, and a charge port.

The pump-motor assembly comprises a pump motor having a pump housing. The pump housing comprises a pump inlet connector, a pump outlet connector, and a pump base.

The pump motor comprises a motor-battery bracket fixed to the pump motor. The motor-battery bracket comprises a battery bracket, a battery side support, and first and second bracket lateral walls.

The tank assembly comprises a tank having a front side, lateral sides, a rear side, a bottom side, a top side, a threaded neck, a tank cap with a duckbill vent hole, a tank strainer, and a self locking tank strap. The front side comprises a puck O-ring groove, and the lateral sides each comprise a strap recess and air gap ribs.

The puck assembly comprises a puck; an O-ring; a mix connector with a mix orifice; a pickup connector; conductive probes low, medium, and high; and probe insulations/parallel spacer.

The handle assembly comprises a handle body having wire passages, a handle top with grip screw posts, a switch hole and a weep valley, a mist switch with a switch light, and a finger grip.

The recessed mist blower assembly is mounted on the blower panel hole, the recess control panel assembly is mounted on the control panel hole, and the threaded valve neck with the valve selector handle mounted thereon extends from the valve threaded neck hole.

The puck assembly is coupled to the tank assembly whereby the puck O-ring groove receives the puck. The conductive probe medium and the intake tube are connected to the puck assembly inside the tank.

The blower coupling shroud fits into the blower, and the blower coupling shroud houses the blower shroud flapper, which is secured by the recess blower panel.

The frame assembly secures the recessed mist blower assembly, a controller/transmitter-receiver assembly, the mix solenoid, the pump-motor assembly, and the battery, and the housing assembly houses the frame assembly and the tank assembly.

It is therefore one of the main objects of the present invention to provide multifunctional misting systems having a compact design.

It is another object of this invention to provide a multifunctional misting system that supports stationary nozzles.

It is another object of this invention to provide a multifunctional misting system having portable mist blowing ability.

It is another object of this invention to provide a multifunctional misting system that is portable.

It is another object of this invention to provide a multifunctional misting system that has a mist wand.

It is another object of this invention to provide a multifunctional misting system that utilizes a remote control.

It is another object of this invention to provide a multifunctional misting system that comprises a more effective delivery system than spraying.

It is another object of this invention to provide a multifunctional misting system that is self-contained with a rechargeable battery and reservoir for months of operation.

It is another object of this invention to provide a multifunctional misting system that has a universal AC charger that makes it chargeable anywhere in the world.

It is another object of this invention to provide a multifunctional misting system that is volumetrically efficient for carrying, transporting, and storage.

It is another object of this invention to provide a multifunctional misting system that can be readily assembled and disassembled without the need of any special tools.

It is another object of this invention to provide a multifunctional misting system, which is of a durable and reliable construction.

It is yet another object of this invention to provide a multifunctional misting system that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
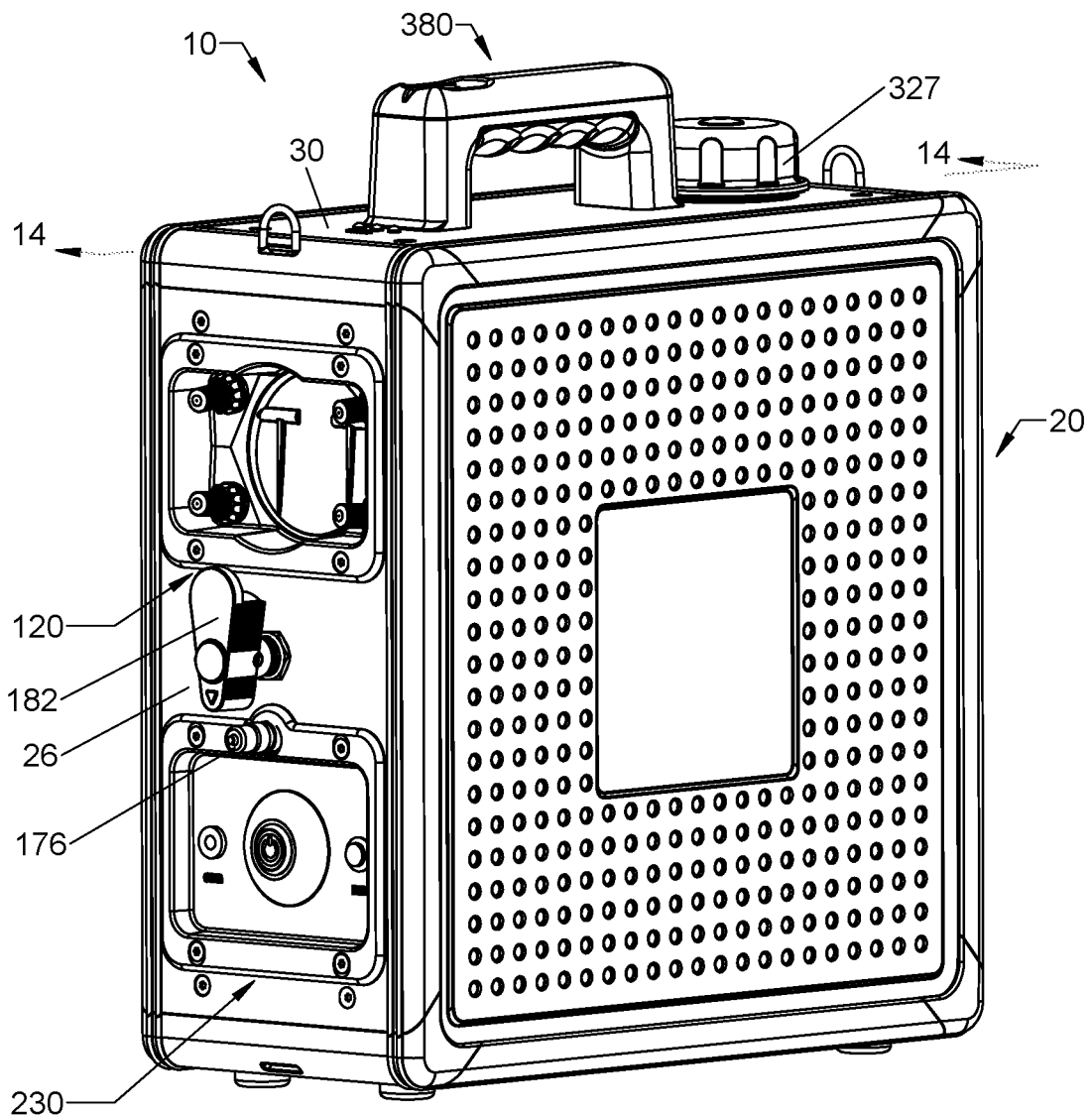
FIG. 1 is an isometric view of the present invention.

Referring now to the drawings, the present invention is a multifunctional misting system for solutions, and is generally referred to with numeral 10. Such solutions can be, but are not limited to: anti-pathogen agents; insect controls—adult or pre-emergent including mosquitoes, bed bugs, lice, and mites; insect repellents; home extermination treatments; plant health fertilizers; insecticides; fungicides; surfactants for drought resistance in public health applications; sunscreen; sanitation products such as sanitizers and anti-pathogens; odor controllers such as deodorizers and fragrances. It can be observed that it basically includes housing assembly 20, controller/transmitter-receiver assembly 60, frame assembly 70, recessed mist blower assembly 120, valve assembly 170, recess control panel assembly 230, pump-motor assembly 260, tank assembly 310, handheld remote control transmitter-receiver 340, puck assembly 350, and handle assembly 380.

Multifunctional misting system 10 may operate as a misting system, a portable mist blowing system, a portable misting wand system, and/or fixed misting stations.

Figure 2:
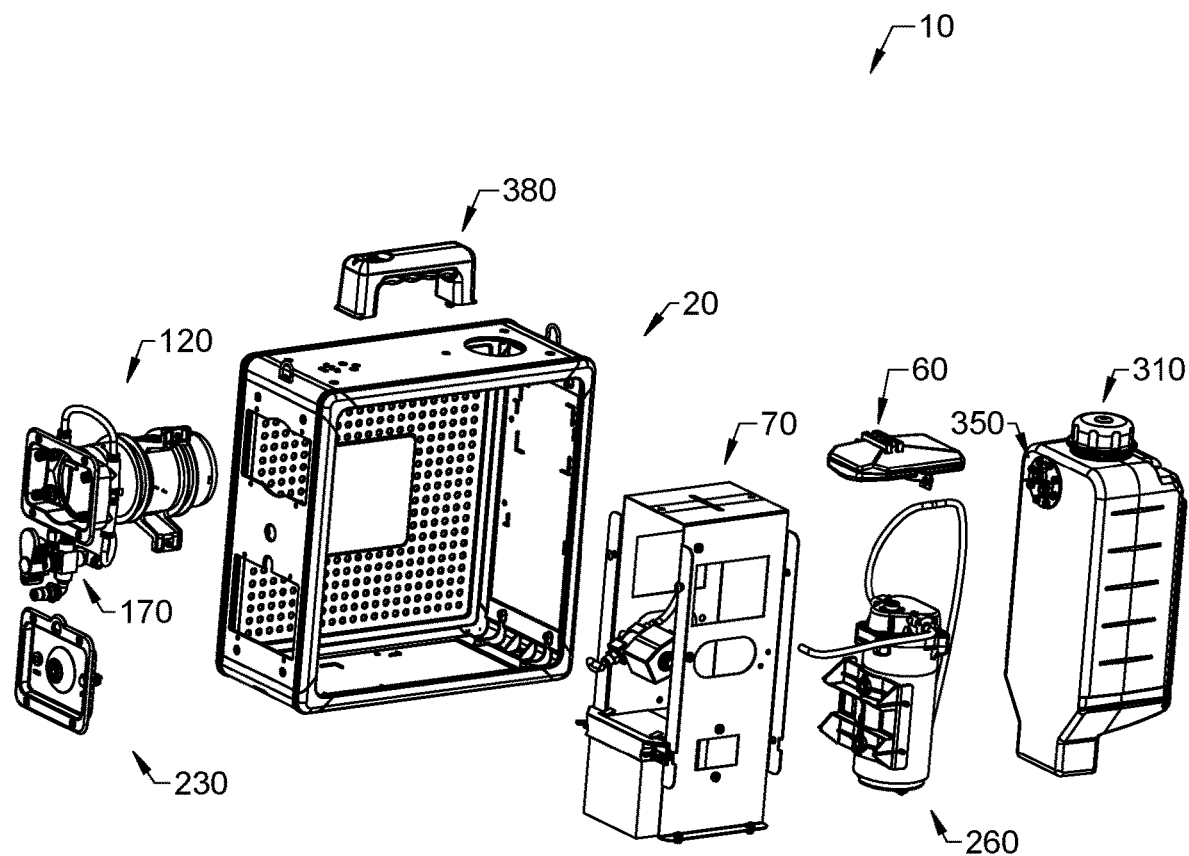
FIG. 2 is an exploded view of the present invention less a wand, a handheld remote control transmitter-receiver, and a shoulder strap.
Figure 3:
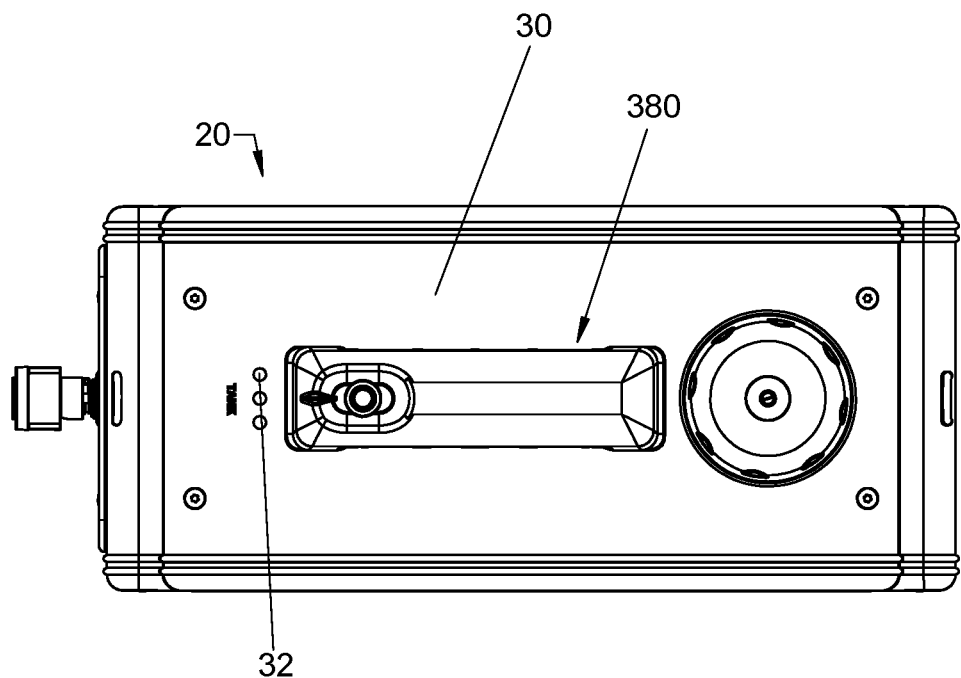
FIG. 3 is a top view of the present invention.

As seen in FIGS. 1, 2, and 3, present invention 10 comprises housing assembly 20, frame assembly 70, recessed mist blower assembly 120 with valve assembly 170, recess control panel assembly 230, pump-motor assembly 260, tank assembly 310 having mounted puck assembly 350, and handle assembly 380.

Housing assembly 20 houses frame assembly 70, recessed mist blower assembly 120 with valve assembly 170, recess control panel assembly 230, pump-motor assembly 260, and tank assembly 310. Handle assembly 380 is mounted onto top panel 30, and tank cap 327 of tank assembly 310 is secured at top panel 30. Housing assembly 20 further houses controller/transmitter-receiver assembly 60. In a preferred embodiment, valve assembly 170 is a three-way valve assembly.

Figure 4:
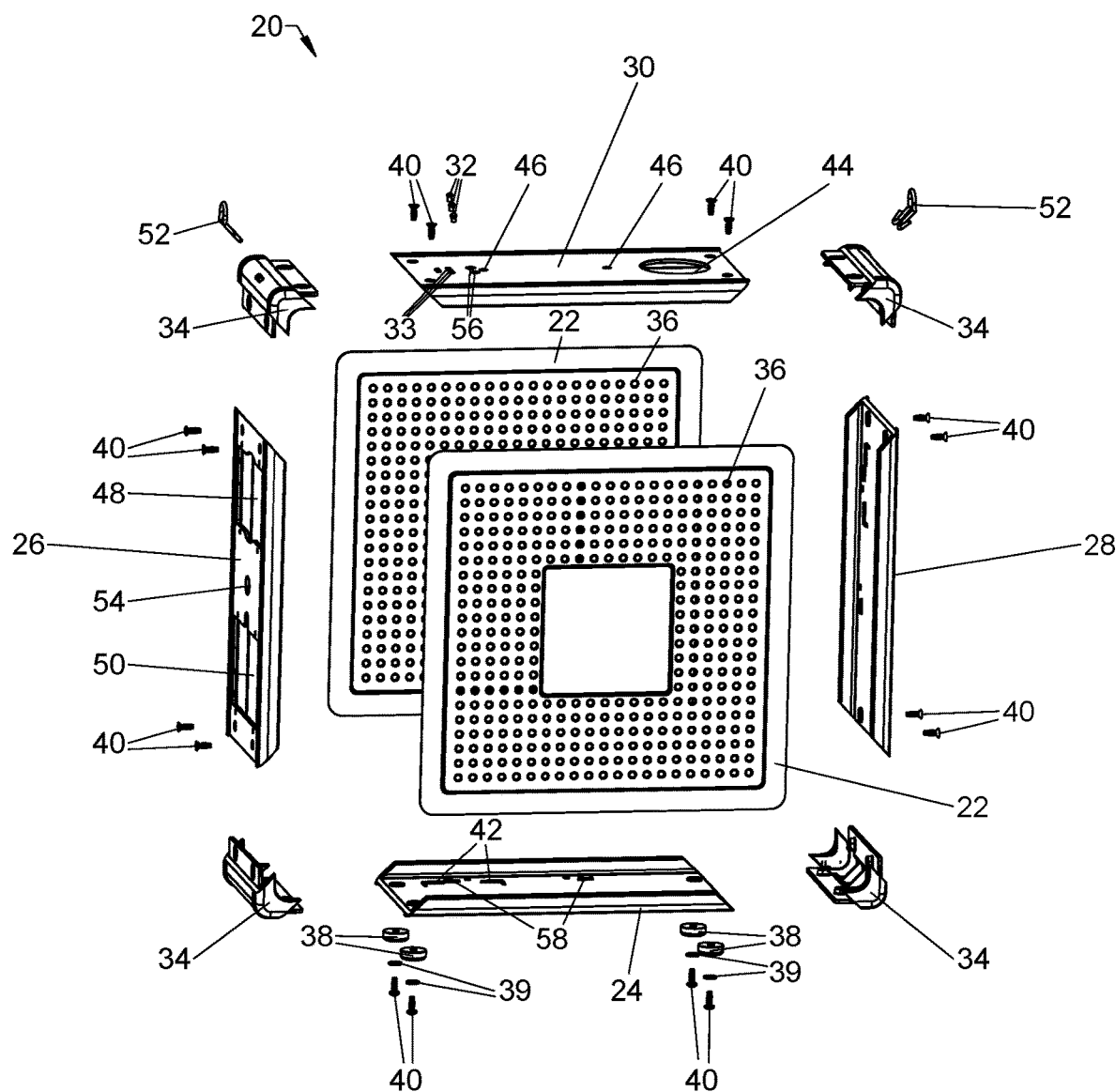
FIG. 4 is an exploded view of a housing assembly of the present invention.

As seen in FIG. 4 housing assembly 20 comprises first and second flat panels 22, bottom panel 24, front panel 26, rear panel 28, top panel 30, light-emitting diode light pipes 32, light pipe holes 33, and locking corners 34 with corner screws 40 and strap loops 52.

Figure 6:
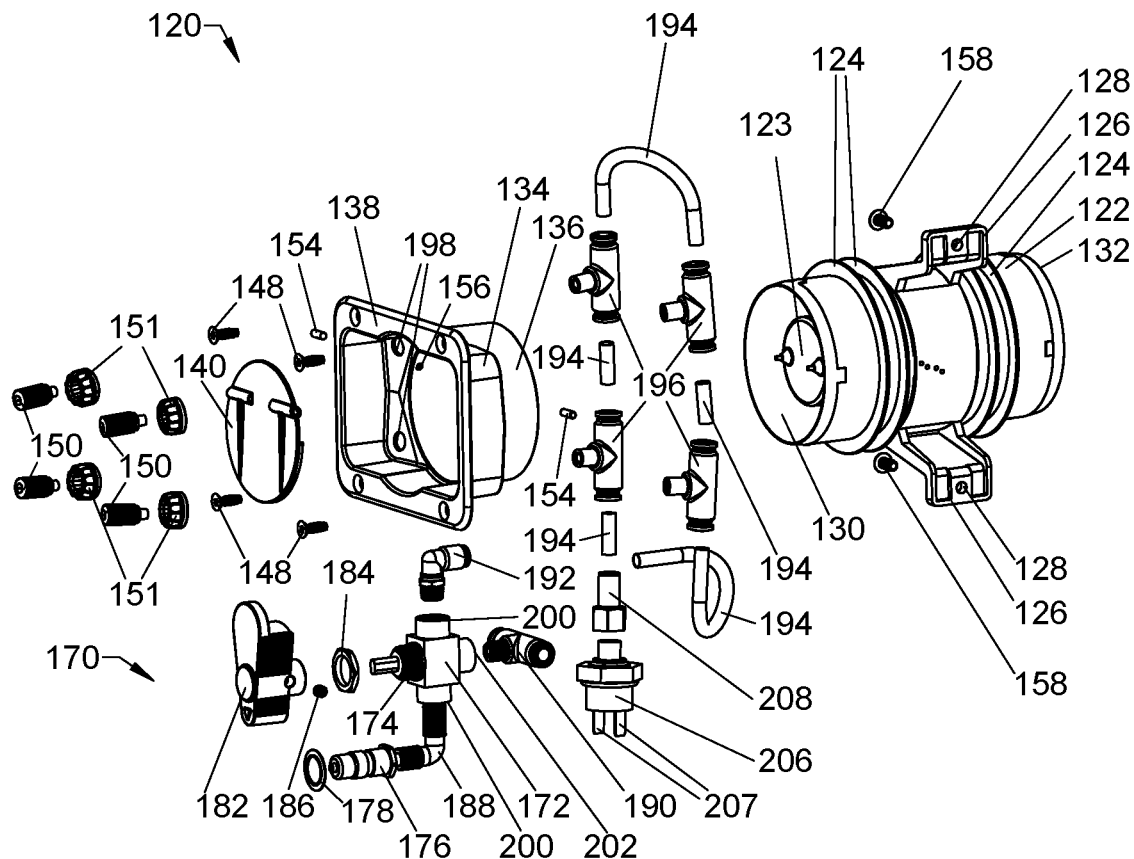
FIG. 6 is an exploded view of a recessed mist blower assembly and valve assembly of the present invention.

First and second flat panels 22 comprise air inlet holes 36 that are designed to prevent rodent and/or insect intrusion while providing adequate air intake for blower 122, seen in FIG. 6. Front panel 26 comprises blower panel hole 48, control panel hole 50, and valve threaded neck hole 54. Top panel 30 comprises tank neck hole 44, handle mount holes 46, and wire passage holes 56. Handle mounting holes 46 allow securing handle assembly 380, as seen in FIG. 1, onto top panel 30. In a preferred embodiment, rear panel 28 and bottom panel 24 are identical. Rear panel 28 and bottom panel 24 both comprise battery trap 42, and frame trap 58. Bottom panel 24 also comprises feet 38 and feet washers 39. Feet 38 are secured with feet washers 39 and corner screws 40 on bottom panel 24. Bottom panel 24 and rear panel 28 further comprises a laser printable window for identifying the unit for history, ownership, and warranty, non seen.

In a preferred embodiment, front panel 26, rear panel 28, top panel 30, and bottom panel 24 each have a groove to restrain first and second flat panels 22 when connected with locking corners 34. Locking corners 34 are designed with injection molding features and utilize a locking system to minimize hardware requirements while simultaneously holding the structure at approximately 90 degrees. Corner screws 40 can be self-threading plastic screws. Front panel 26, rear panel 28, top panel 30, and bottom panel 24 each comprise screw posts to receive corner screws 40.

Figure 5:
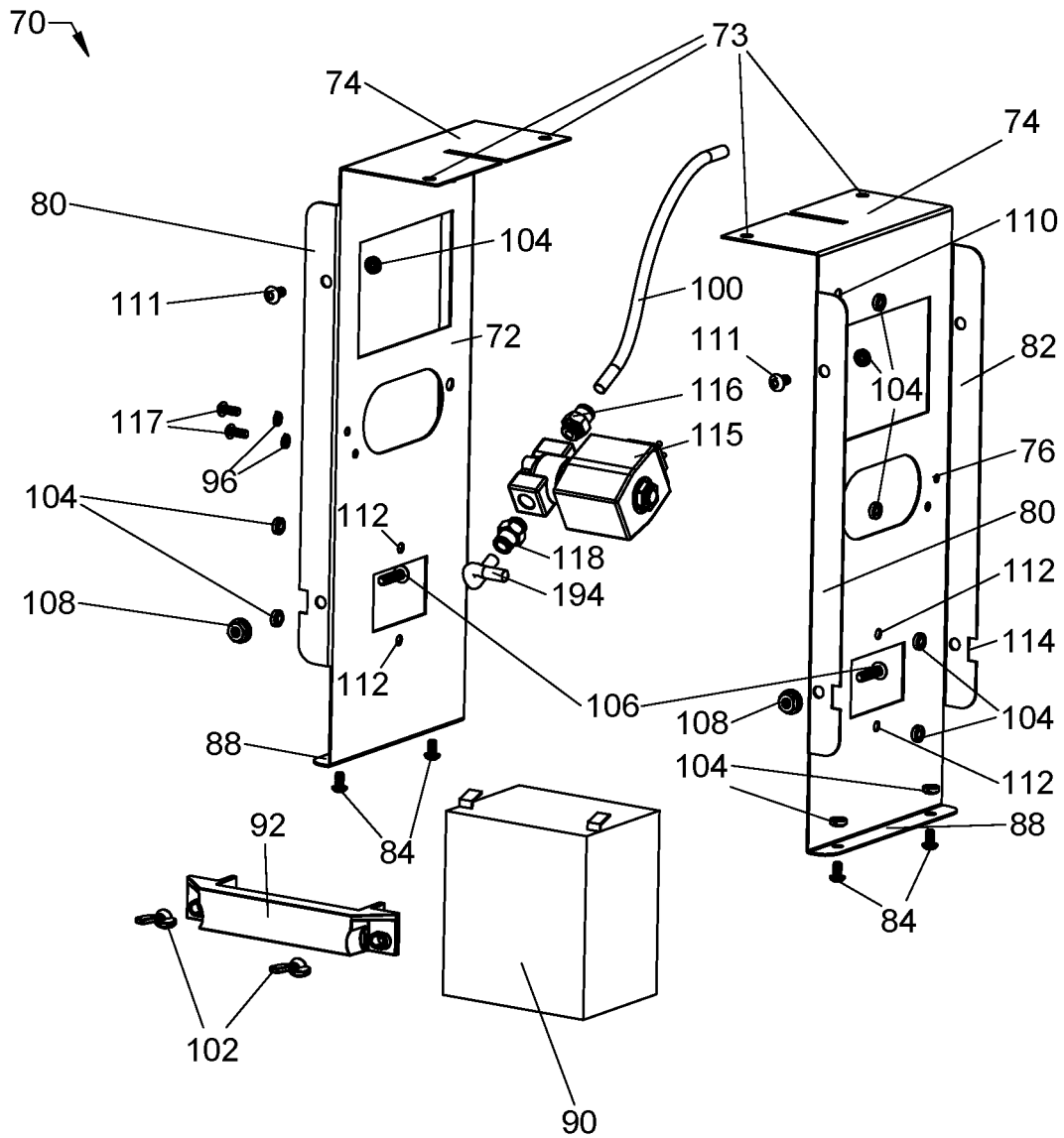
FIG. 5 is an exploded view of a frame assembly of the present invention.

As seen in FIG. 5, frame assembly 70 comprises solenoid side frame 72 and blower side frame 76. Solenoid side frame 72 and blower side frame 76 each comprise a respective top wall 74, first and second lateral stiffeners 80 and 82, frame screws 84, and bottom panel attachment base 88.

Figure 14:
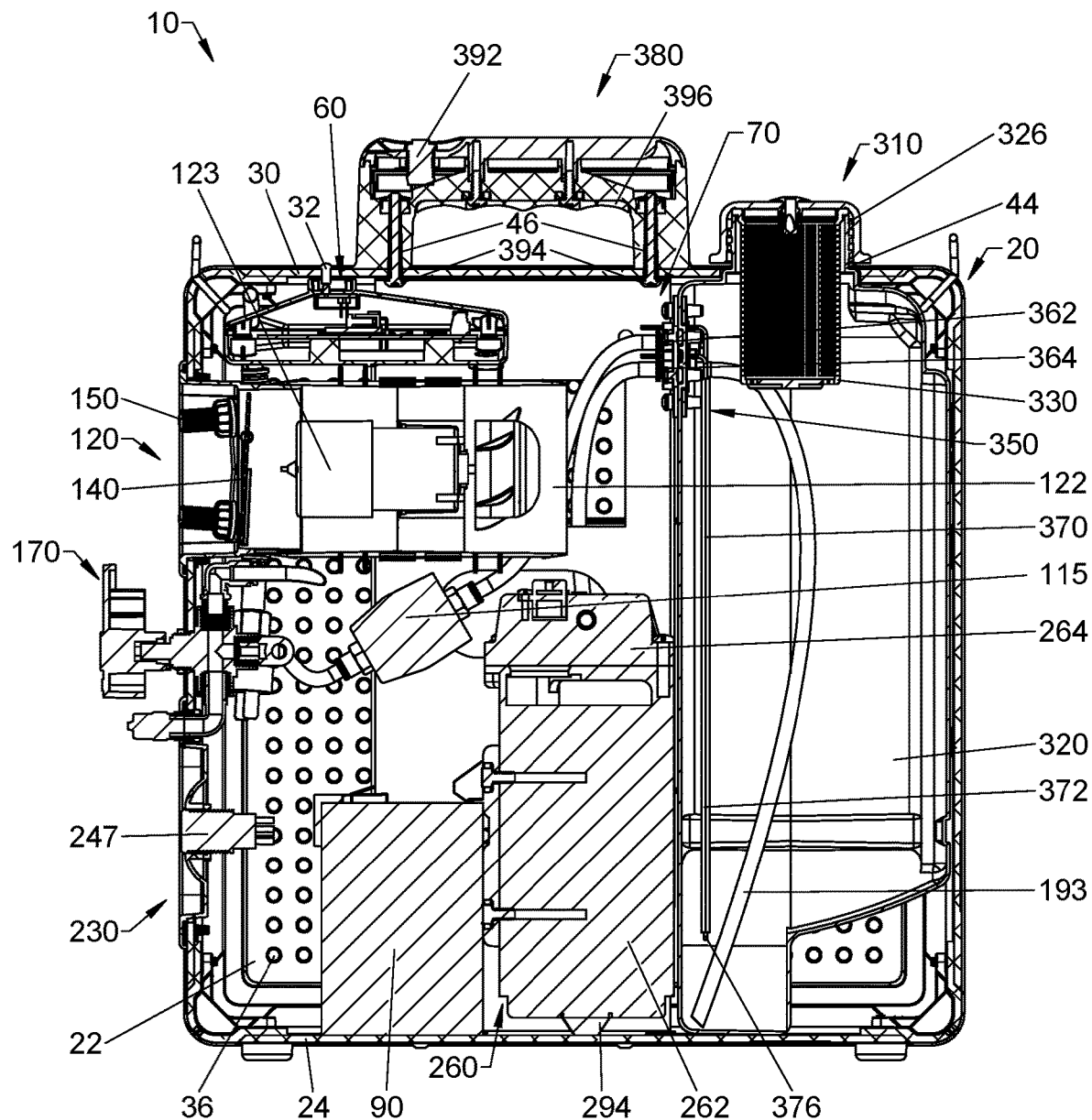
FIG. 14 is a cut view taken along lines 14-14 as seen in FIG. 1.

Top walls 74 comprise frame-handle through holes 73. Solenoid side frame 72 and blower side frame 76 respectively comprise pump bracket unified nut holes 112. Blower side frame 76 comprises blower unified nut holes 110 and controller assembly mounting screws. Blower unified nut holes 110 and pump bracket unified nut holes 112 receive recessed mist blower assembly 120 and pump-motor assembly 260, as seen in FIG. 14, respectively, which are secured by unified nuts 104. Frame assembly 70 further comprises battery 90 and battery retainer 92 with battery retainer wingnuts 102. Battery retainer 92 secures battery 90 and is fixed with battery retainer stud bolts 106 with respective stud retainer nuts 108. Frame assembly 70 further comprises mix solenoid 115, mix output adapter 116, split washers 96, mix tube 100, solenoid screws 117, mix input adapter 118, and tee 119. Mix solenoid 115 mounts to solenoid side frame 72 with solenoid screws 117.

As seen in FIG. 6, recessed mist blower assembly 120 comprises blower 122 having blower motor 123, blower flanges 124, first and second blower bases 126 with respective blower base mounting holes 128, blower outlet 130, and blower inlet 132. Recessed mist blower assembly 120 further comprises recess blower panel 134, blower coupling shroud 136, blower bezel 138, blower shroud flapper 140, recess blower panel screws 148, nozzles 150, and tee retainers 151. In a preferred embodiment, there are four nozzles 150. Recessed mist blower assembly 120 further comprises flapper hinge pins 154, hinge pinholes 156, and blower mounting screws 158. Blower coupling shroud 136 fits into blower 122 and houses blower shroud flapper 140, which is secured by recess blower panel 134 by flapper hinge pins 154 and hinge pinholes 156. Blower coupling shroud 136 comprises a blower shroud slot for wire passage, which is also used as a stop for blower shroud flapper 140, removing the need for a hard stop. Blower shroud flapper 140 keeps rodents and insects from entering through blower coupling shroud 136.

Valve assembly 170 comprises valve body 172 having threaded valve neck 174. Valve selector handle 182 is secured by set screw 186. Valve body 172 is secured to front panel 26, as seen in FIG. 1, by threaded valve neck 174 passing through valve threaded neck hole 54, seen in FIG. 4, and secured by retainer nut 184. Valve assembly 170 further comprises adapting elbow 188, adapting tee 190, and elbow adapter 192. Valve assembly 170 further comprises first and second outlets 200 and inlet 202. Adapting elbow 188 and elbow adapter 192 are positioned on a respective outlet 200, and adapting tee 190 is positioned on inlet 202.

Valve assembly 170 further comprises quick connect 176 having poppet valve, not seen, and quick connect retainer 178. Quick connect 176 is connected to adapting elbow 188.

Present invention 10 further comprises intake tube 193, seen in FIG. 14, and output tubes 194, tee adapters 196, and tee adapter holes 198 to receive respective tee adapters 196. Pressure switch 206 comprises normally open contacts 207. Pressure switch 206 is connected into pressure switch adapter 208. Present invention 10 can provide misting protection in three ways, remote stationary misting, a portable wand misting, or a portable mist-blower option, which are selected by rotating valve selector handle 182 to point up for mist blower and down for wand or station misting.

Figure 7:
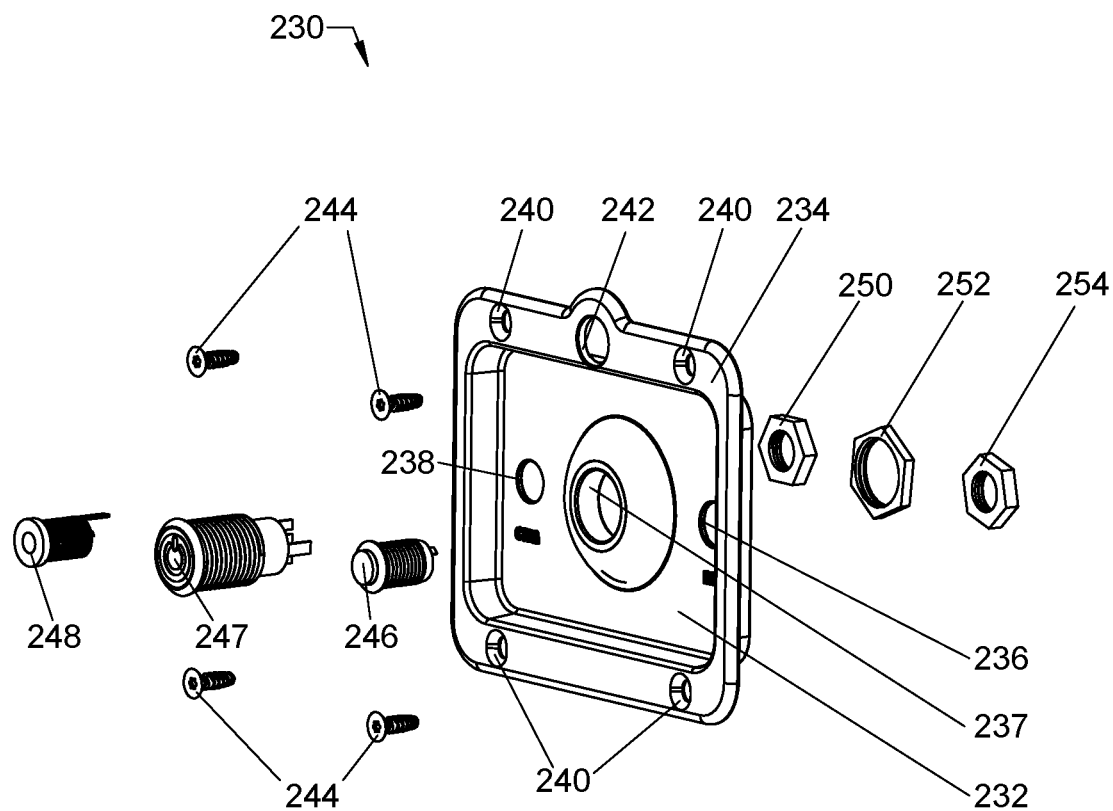
FIG. 7 is an exploded view of a recess control panel assembly of the present invention.

As seen in FIG. 7, recess control panel assembly 230 comprises recess control panel 232 having control bezel 234. Recess control panel 232 has mix switch hole 236 to receive mix switch 246, power switch hole 237 to receive lighted power switch 247, and charge port hole 238 to receive charge port 248. Recess control panel assembly 230 further comprises charge port nut 250, power switch nut 252, and mix switch nut 254. Control bezel 234 comprises mounting holes 240 and quick connect hole 242. Mounting holes 240 receive recess panel screws 244 to secure recess control panel assembly 230.

Figure 8:
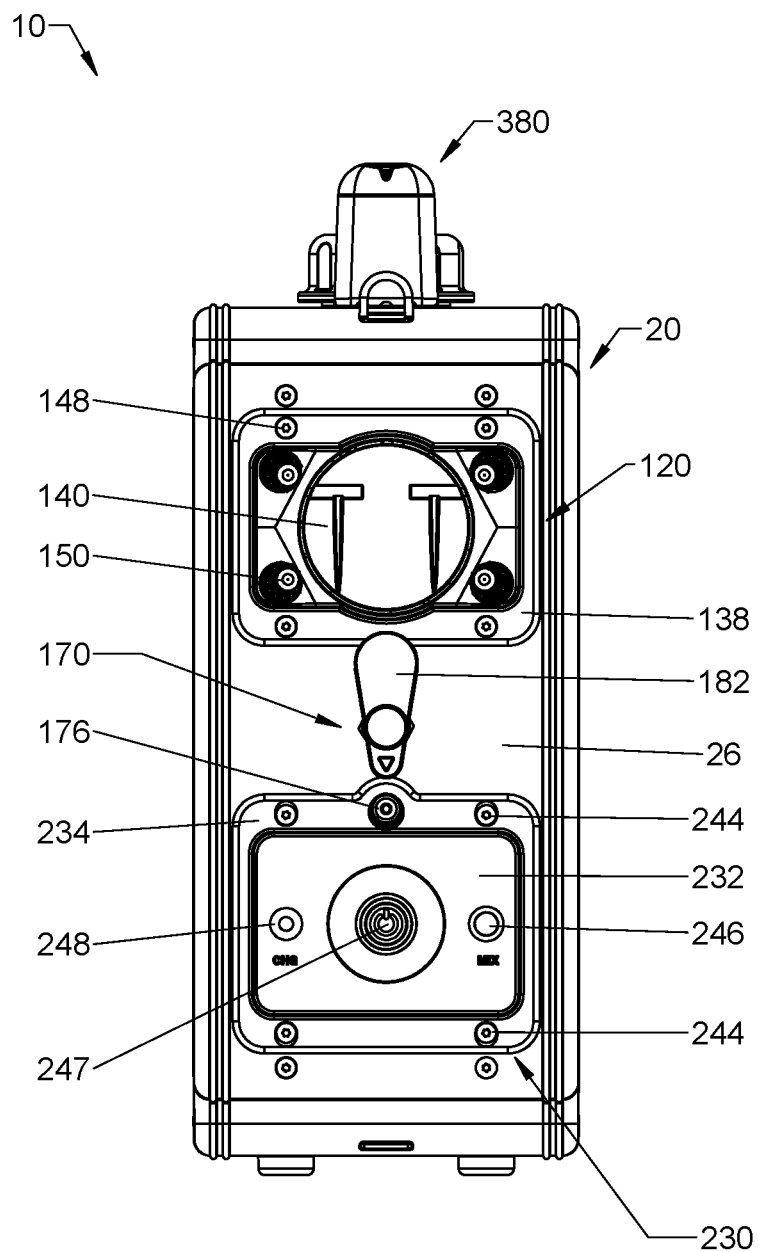
FIG. 8 is a front view of the present invention.

As seen in FIG. 8, recessed mist blower assembly 120, valve assembly 170, and recess control panel assembly 230 mount onto housing assembly 20, specifically onto front panel 26. Recessed mist blower assembly 120 is mounted on blower panel hole 48 seen in FIG. 4, whereby blower bezel 138 is fixed with recess blower panel screws 148 onto front panel 26. Blower shroud flapper 140 and nozzles 150 are exposed on front panel 26. Threaded valve neck 174, seen in FIG. 6, with valve selector handle 182 mounted thereon extends from valve threaded neck hole 54, seen in FIG. 4. Recess control panel assembly 230 mounts onto control panel hole 50 seen in FIG. 4, whereby control bezel 234 is fixed with recess panel screws 244 onto front panel 26. Recess control panel 232 with mix switch 246, lighted power switch 247, and charge port 248 are exposed on front panel 26.

Figure 9:
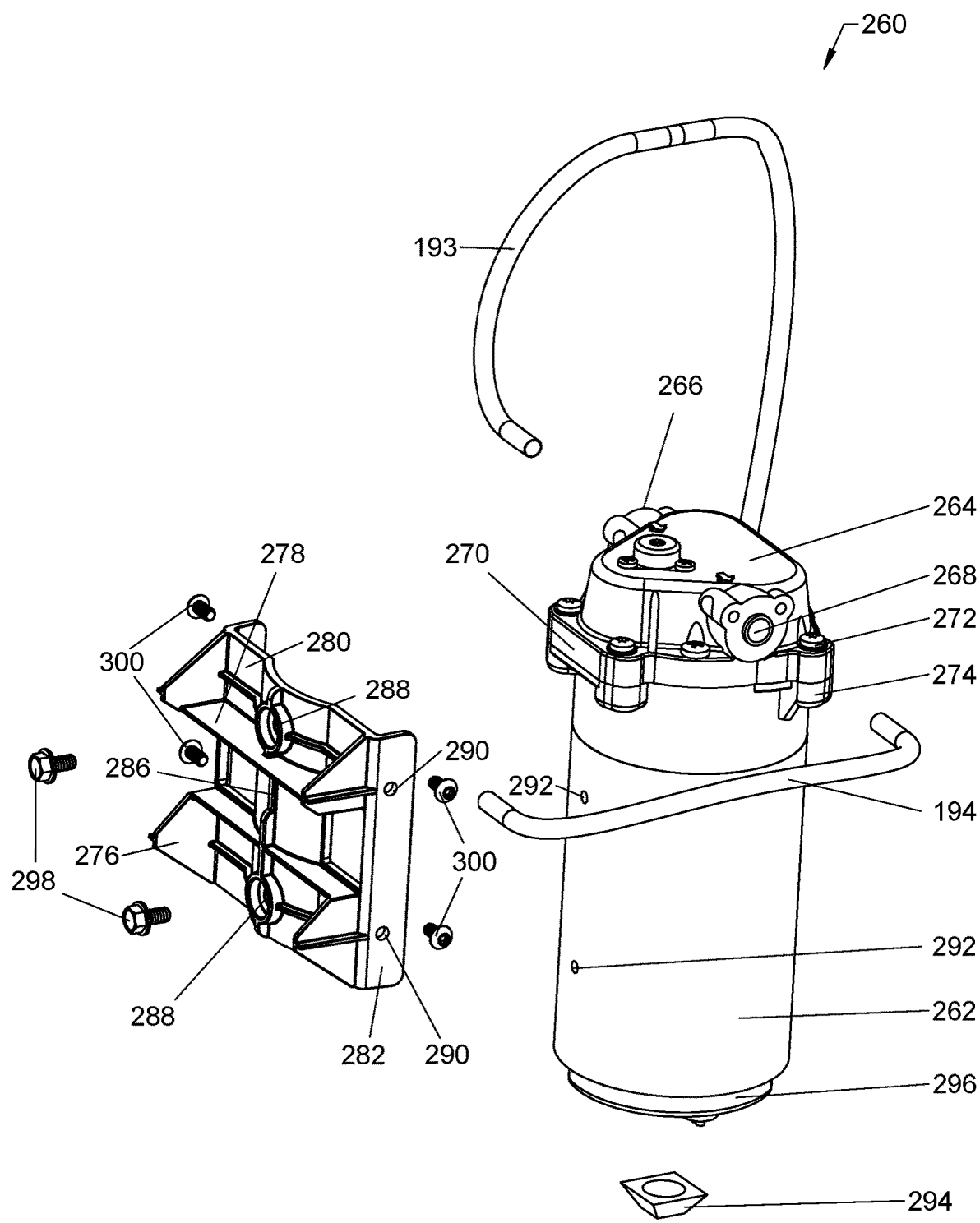
FIG. 9 is an exploded view of a pump-motor assembly of the present invention.

As seen in FIG. 9, pump-motor assembly 260 comprises pump motor 262 having pump housing 264. Pump housing 264 comprises pump inlet connector 266, pump outlet connector 268, and pump base 270. Pump housing 264 is fixed to pump motor 262 by pump mount screws 272 secured at screw post 274. Pump-motor assembly 260 further comprises spacer 294 positioned between motor base 296 and bottom panel 24, seen in FIG. 14. Pump motor 262 comprises motor-battery bracket 280 fixed thereto. Motor-battery bracket 280 comprises bracket lateral walls 282, battery side support 276, battery bracket 278, and tank strap channel 286. Motor-battery bracket 280 is fixed to pump motor 262, whereby motor mounting screws 298 pass through first and second motor mount holes 288 to be fixed on motor mounting holes 292. Bracket lateral walls 282 secure pump-motor assembly 260 onto solenoid side frame 72 and blower side frame 76, as seen in FIG. 5. In a preferred embodiment, bracket mounting screws 300 pass through respective bracket through holes 290 and respective pump bracket unified nut holes 112 and are secured by unified nuts 104, as seen in FIG. 5.

Figure 10:
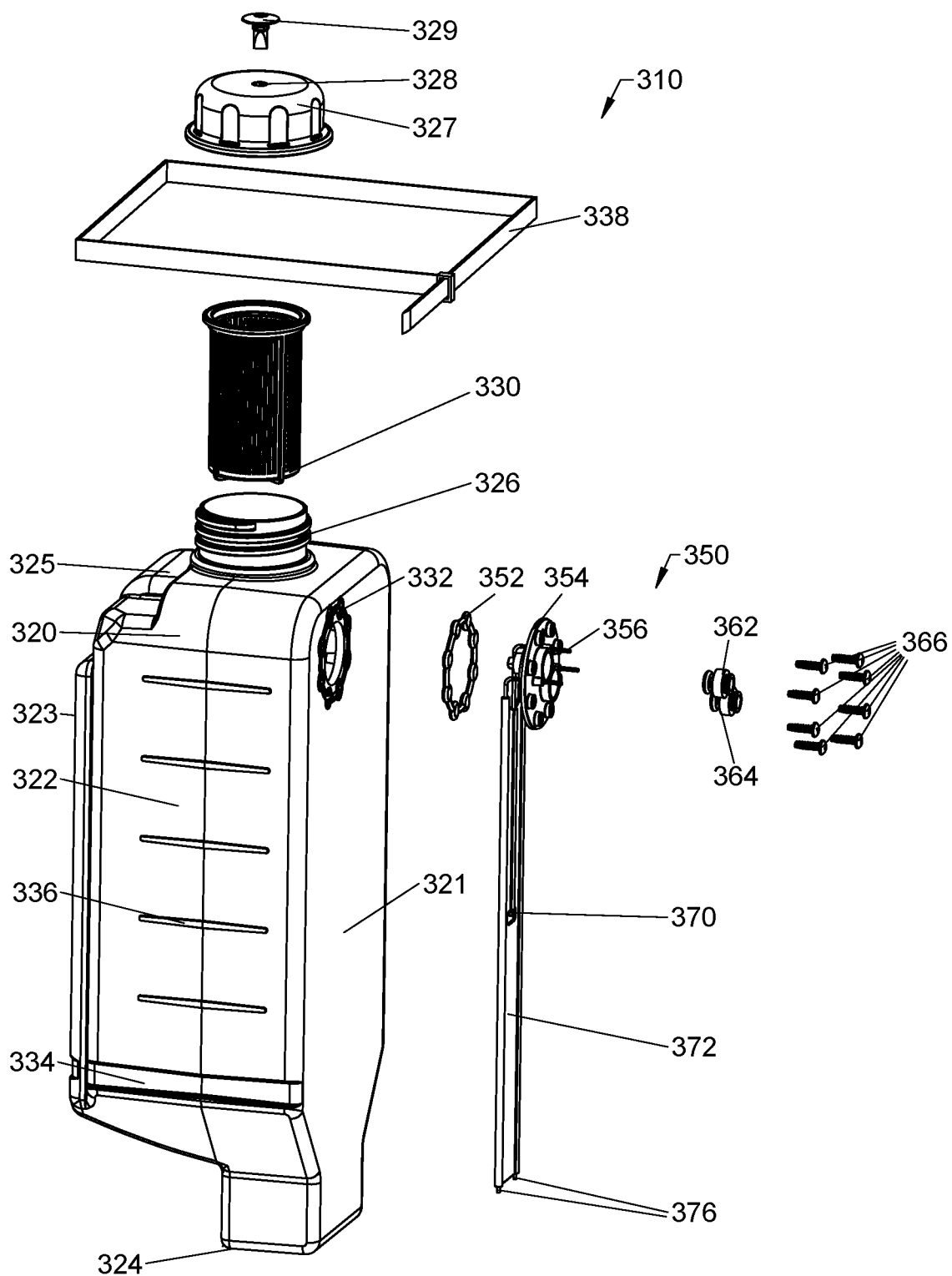
FIG. 10 is an exploded view of a tank assembly and a puck assembly of the present invention.

As seen in FIG. 10, tank assembly 310 comprises tank 320. Tank 320 comprises front side 321, lateral sides 322, rear side 323, bottom side 324, and top side 325. Front side 321 comprises puck O-ring groove 332. Tank assembly 310 further comprises tank strainer 330. Lateral sides 322 each comprise air gap ribs 336 allowing first and second flat panels 22, as seen in FIG. 4, space for improved airflow. Top side 325 comprises threaded neck 326 having tank cap 327 with duckbill vent hole 328 and duckbill vent 329. Securing is achieved with self-locking tank strap 338 that secures tank 320 and frame assembly 70 together, seen in FIG. 5, when settled in strap recess 334 on lateral sides 322 and rear side 323.

Present invention 10 further comprises puck assembly 350. Puck assembly 350 comprises O-ring 352 and puck 354. Puck 354 comprises conductive probe high 356, mix connector 362 with a mix orifice, and pickup connector 364. The mix orifice on mix connector 362 accelerates and directs the fluid downward. Puck assembly 350 further comprises puck mounting screws 366. Puck 354 is a multi/use item providing a sealed passage using O-ring 352 between puck 354 and puck O-ring groove 332 held by puck mounting screws 366.

Puck 354 also secures conductive probe low/no 376, conductive probe medium 370, conductive probe high 356, and probe insulation/parallel spacer 372. Mechanical connection is made by overmolding, providing electrical connection through puck 354, providing continuity between conductive probe medium 370, conductive probe low/no 376, conductive probe high 356, and to controller/TXRX assembly 60 via connection (not show).

Conductive probe high 356, conductive probe medium 370, and conductive probe low/no 376 allow calculated levels for high, medium, and low fluid indicators while the lowest points being positioned above the pick-up, detects when fluid no longer in contact, triggering a "self-preservation" all-stop, preventing the pump from losing prime. Probe insulation/parallel spacer 372 is placed to expose bottom tips of conductive probe high 356, conductive probe medium 370, and conductive probe low/no 376 while insulating conductive probe medium 370 and conductive probe low/no 376 to create an impedance differential used to decipher tank level and no fluid.

Figure 11:
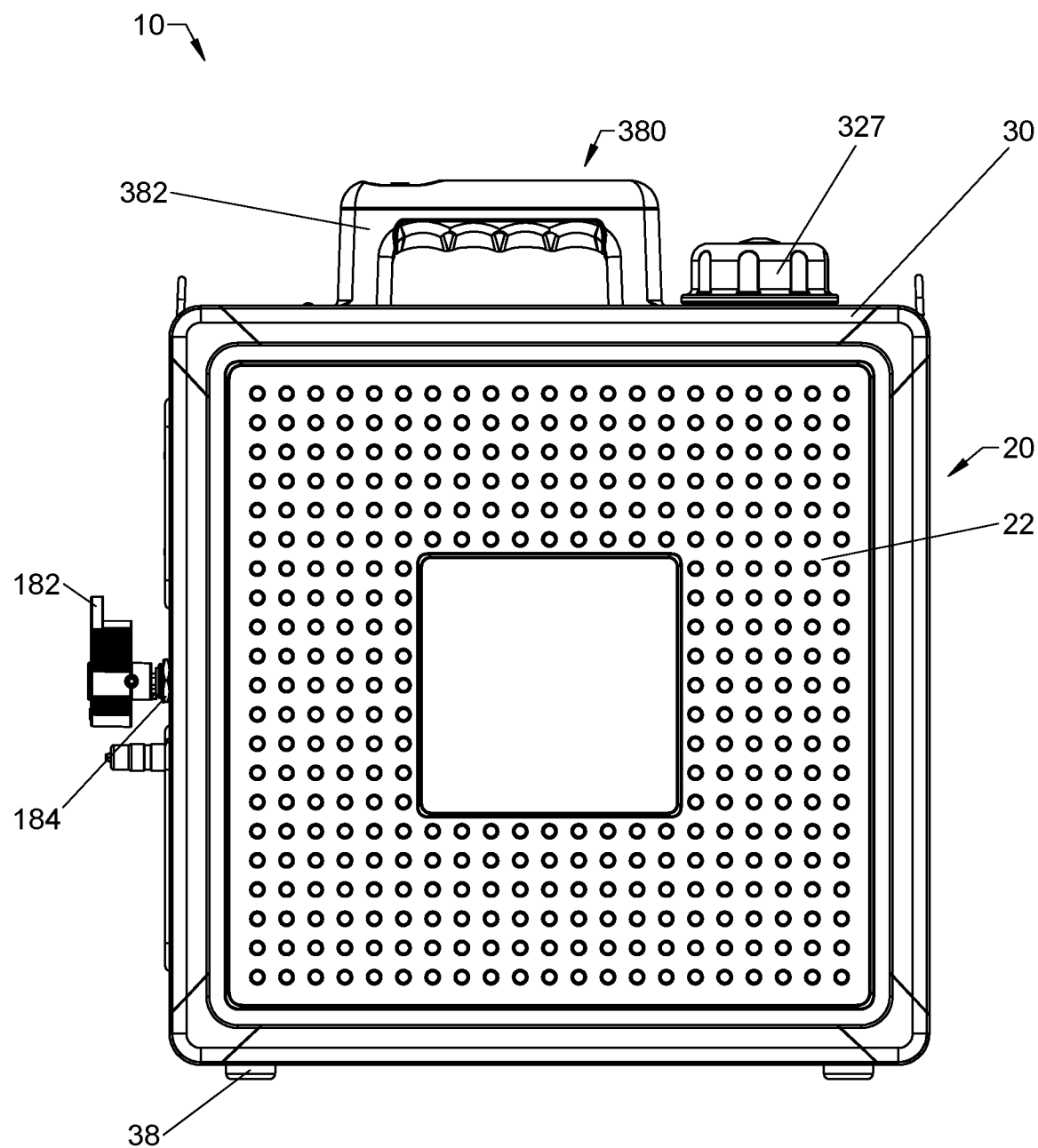
FIG. 11 is a lateral view of the present invention.
Figure 12:
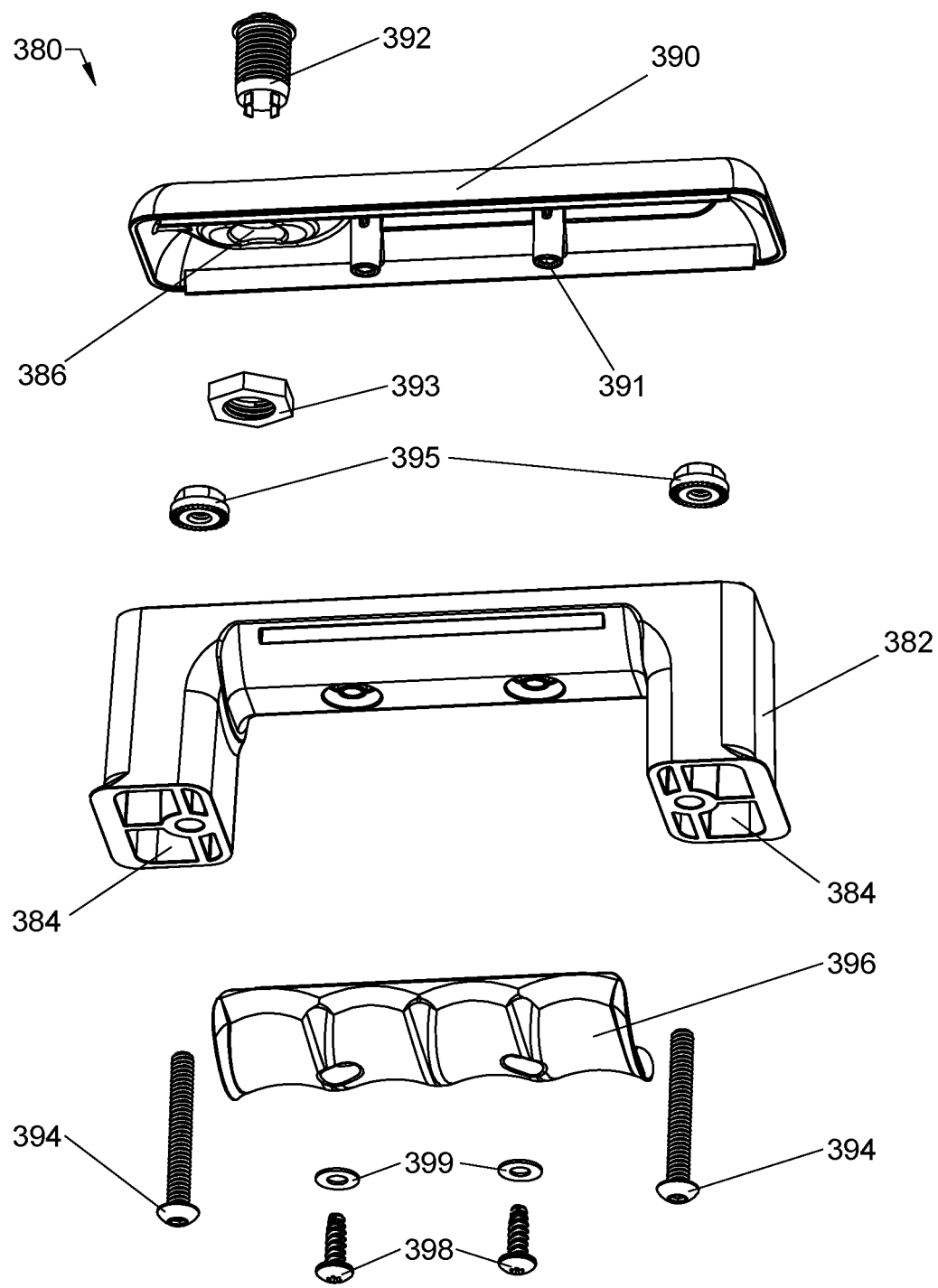
FIG. 12 is an exploded bottom view of a handle assembly of the present invention.
Figure 13:
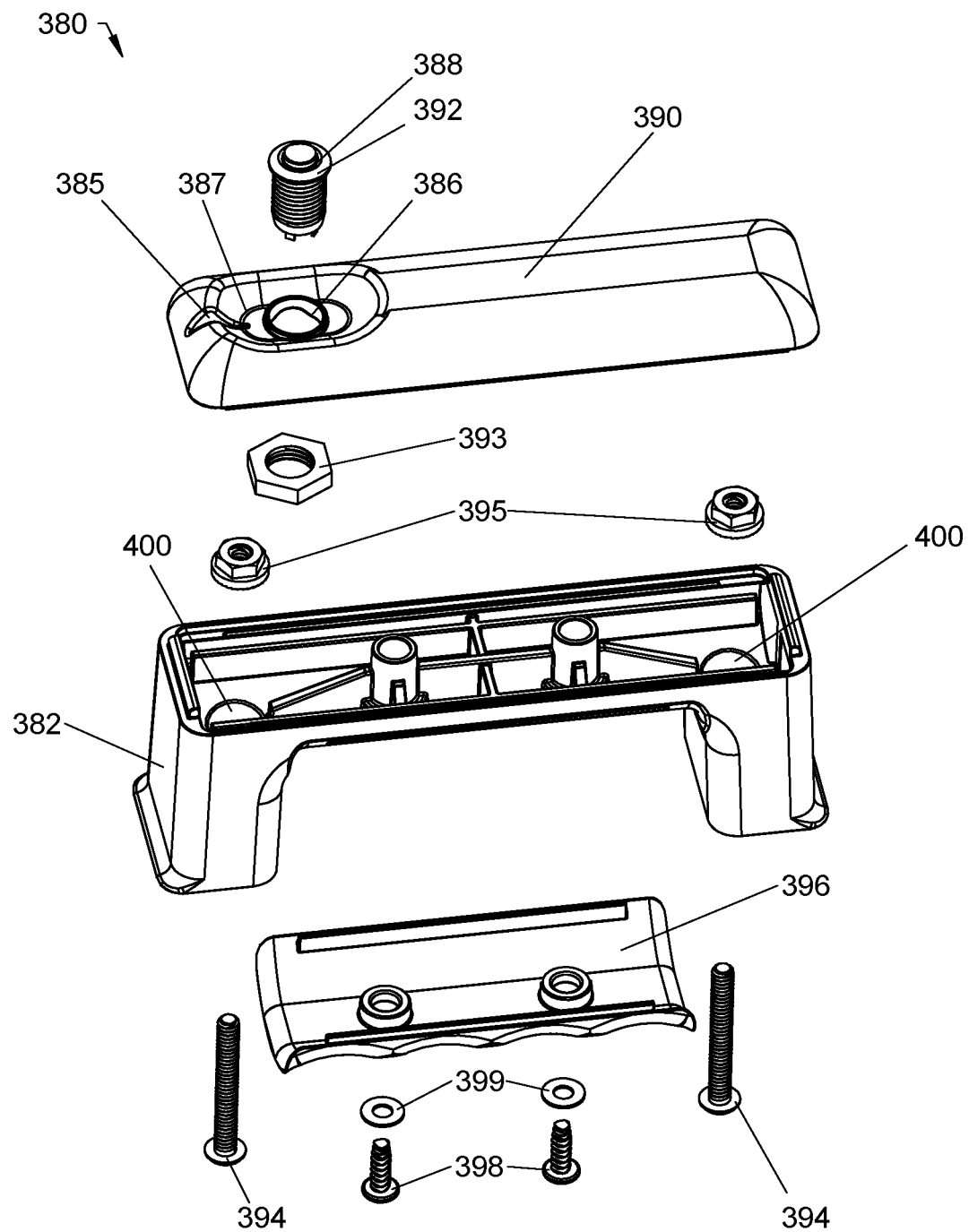
FIG. 13 is an exploded top view of the handle assembly of the present invention.

As seen in FIGS. 11, 12, and 13 handle assembly 380 is mounted onto top panel 30. Handle assembly 380 is slightly oversized for comfort comprising handle body 382, handle top 390, and a rubberized finger grip 396. Handle body 382 has wire passages 384, and mounting screw recesses 400. Wire passages 384 allow wires from mist switch 392 to pass therethrough. Handle top 390 comprises switch hole 386, grip screw posts 391, and mist switch 392 having switch light 388. Switch light 388 is on dim when lighted power switch 247, seen in FIG. 7, is on. Switch light 388 and lighted power switch 247 light notably brighter whenever pump motor 262, seen in FIG. 9, is energized. Both are controlled by controller/transmitter-receiver assembly 60, seen in FIG. 14. Switch light 388 and lighted power switch 247, seen in FIG. 7, blink when no fluid is detected in tank 320 by conductive probe high 356, conductive probe medium 370, and conductive probe low/no 376, seen in FIG. 10. Handle top 390 further comprises weep valley 385 and thumb recess 387. Finger grip 396 is fixed to grip screw posts 391 with grip screws 398 and grip screw washers 399. Weep valley 385 prevents water pooling in thumb recess 387. Switch hole 386 receives mist switch 392. Mist switch 392 when depressed activates controller/transmitter-receiver assembly 60. Mist switch 392 allows using recessed mist blower assembly 120, seen in FIG. 6, without having to press a RF remote to activate. Handle assembly 380 further comprises mist switch nut 393, mounting screws 394, and mounting nuts 395.

As seen in FIG. 14, frame assembly 70 secures controller/transmitter-receiver assembly 60, battery 90, mix solenoid 115, recessed mist blower assembly 120, and pump-motor assembly 260. First and second blower bases 126, seen in FIG. 6, are mounted onto blower side frame 76, seen in FIG. 5, and bracket lateral walls 282, seen in FIG. 9, are mounted onto solenoid side frame 72 and blower side frame 76, seen in FIG. 5, respectively. Housing assembly 20 houses frame assembly 70 and tank assembly 310, wherein tank assembly 310 is exteriorly secured to frame assembly 70 by self locking tank strap 338, seen in FIG. 10. Frame assembly 70 comprises tank strap notches 114, as seen in FIG. 5, to receive self locking tank strap 338. Threaded neck 326 is flared to snug top tank neck hole 44 on top panel 30. This flare also secures tank assembly 310. Controller/transmitter-receiver assembly 60 is a weatherized enclosure containing a transceiver/controller to energize pump-motor assembly 260. Controller/transmitter-receiver assembly 60 also controls intensity of power and mist switch 392. When nozzles 150 are activated, blower 122 will automatically turn on by pressure switch 206 seen in FIG. 6. Then, when deactivated, controller/transmitter-receiver assembly 60 will de-energize pump-motor assembly 260 and pulse mix solenoid 115 will briefly drop output tube 194, seen in FIG. 9, pressure quickly to near zero, preventing nozzles 150 from dripping or leaking. Pressure switch 206 automatically stops blower 122 when pressure of nozzles 150 sufficiently drops as seen in FIG. 9.

Air for blower 122 intakes is pulled through air inlet holes 36. Outflow of blower 122 is protected by blower shroud flapper 140 designed to open outwardly when pressure is present, and gravity shuts it when no pressure is present. Blower shroud flapper 140 covers exhaust and cannot be pushed inward, protecting against rodent and insect intrusion. The function of recessed mist blower assembly 120 is to accelerate and propel mist that is dispensed out from nozzles 150 forming a long-range column to maximize coverage. Handle assembly 380 is secured onto top panel 30 of housing assembly 20 with mounting screws 394. Mounting screws 394 also secure frame assembly 70 to top panel 30. Pump motor 262 is supplied by intake tube 193 going from tank 320 through pickup connector 364 to pump intake connector 266, as seen in FIG. 9. Puck assembly 350 allows for mixing by being offset, avoiding tank strainer 330 and provides an orifice to accelerate fluid for better mixing.

Mixing is accomplished when puck mix port, having mix connector 362 and shaped puck port, receives pressurized fluid from pump-motor assembly 260, through mix solenoid 115 through mix output adapter 116 and mix tube 100, as seen in FIG. 5. Shaped discharger discharges into tank 320 for mix in a restrictive and downward manner, whenever mix solenoid 115 and pump motor 262 are both energized by controller/transmitter-receiver assembly 60. Mix solenoid 115 is energized through controller/transmitter-receiver assembly 60. Depressing mix switch 246, as seen in FIG. 8, commands the controllers to activate pump motor 262 and mix solenoid 115 at once. Tee adapter 196 connected to output tube 194, as seen in FIG. 6, provides a fluid path of least resistance for mixing. Alternate path is impeded by nozzles 150 or an internal crack valve.

In a preferred embodiment, tank assembly 310 is equipped with a low fluid sensor. Controller/transmitter-receiver assembly 60 interprets the sensor and disables pump motor 262 during low fluid level, dims power light, and flashes power light when disabled by low fluid or freeze sensor by disabling actuation for a period of time, or low battery. The control board responds to radio frequency (RF) remote or mist switch 392, mix switch 246 seen in FIG. 8, and lighted power switch 247. Mist switch 392 has direct control and actuates any duration while pressed. Each radio frequency command is a timed event, duration predetermined by sender as 15, 30, or 45 seconds of runtime.

Figure 17:
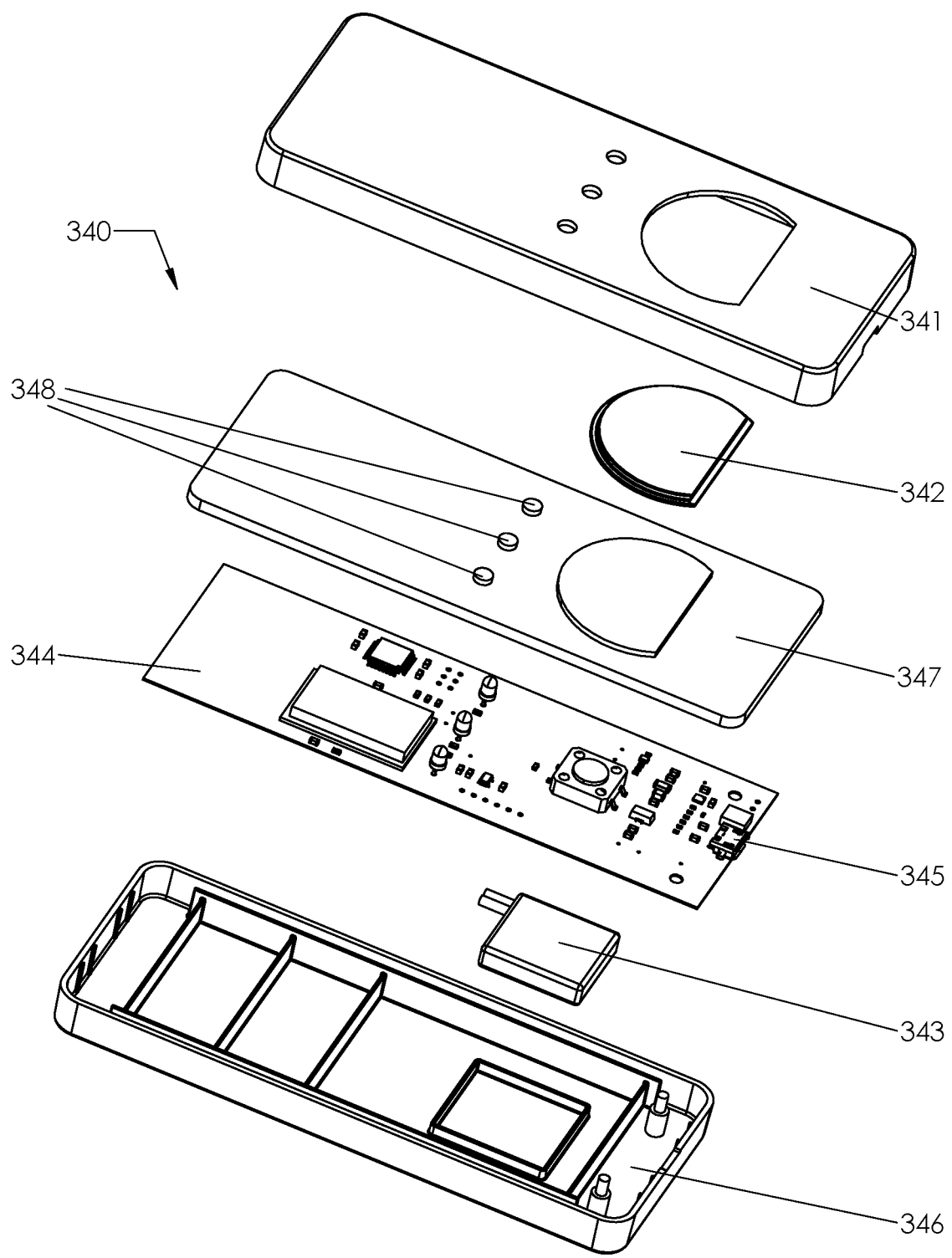
FIG. 17 is an exploded view of a handheld remote control transmitter-receiver.

When present invention 10 is actuated by handheld remote control transmitter-receiver 340, seen in FIG. 17, auto-mix is performed for a few seconds prior to command execution.

When Controller/transmitter-receiver assembly 60 receives command to mist start verification is displayed in the form of tank 320 read, illuminating 1, 2, or 3 light-emitting diode light pipes 32. At the same time, tank 320 read is mirrored to handheld remote control transmitter-receiver 340 as start verification.

Light-emitting diode light pipes 32:
1=low
2=medium
3=high

When Controller/transmitter-receiver assembly 60 detects a "No-Go" situation, light-emitting diode light pipes 32 will illuminate 1, 2 or 3 light-emitting diode light pipes 32 to indicate "No-Go" due to the following:
1) Internal sensors (Battery low, freezing)
2) sensor input (tank 320 level low)

Figure 15:
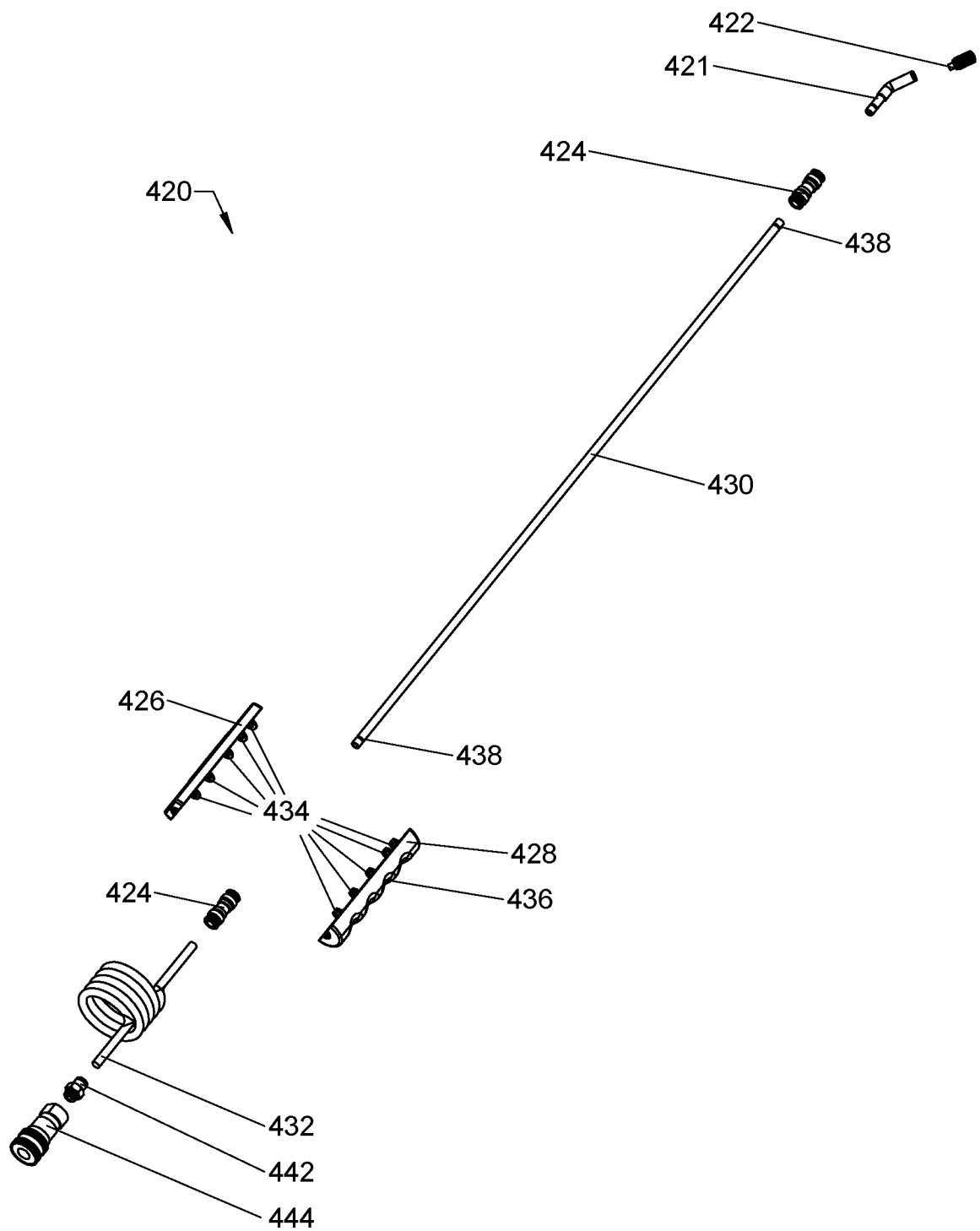
FIG. 15 is an exploded view of a misting wand assembly.

Present invention 10 has 3 light-emitting diode light pipes 32 located on top panel 30, in front of handle assembly 380. They display tank 320 level in real time while present invention 10 is powered "on". Light-emitting diode light pipes 32 will represent tank 320 level as follow:
1=low
2=medium
3=high If tank 320 below low conductive probe low/no 376, all 3 light-emitting diode light pipes 32 will flash to indicate a problem. Problems displayed can be the following:
1) Low fluid
2) Low battery
3) Freezing As seen in FIG. 15, misting wand assembly 420 comprises angled nozzle adapter 421, misting nozzle 422, coupling 424, grip top 426, and pipe 430. Pipe 430 comprises pipe grooves 438. Misting wand assembly 420 further comprises grip top 426 and grip bottom 428 having locking alignment holes 434, and finger grooves 436. Grip top 426 and grip bottom 428 form a handle having a screw less self-locking design. Grip top 426 and grip bottom 428 houses coupling 424, which locks pipe 430 through pipe grooves 438 after passing through locking alignment holes 434.

Misting wand assembly 420 further comprises tubing 432, and adapter 442 having quick connect adapter 444. Misting wand assembly 420 may be used for direct applications in specific areas in portable mist wand applications actuated by mist switch 392, seen in FIG. 13, located in handle assembly 380. Misting wand assembly 420 is dripless due to a nozzle crack valve and mix solenoid 115, seen in FIG. 5, pulse-pressure drop feature.

Figure 16:
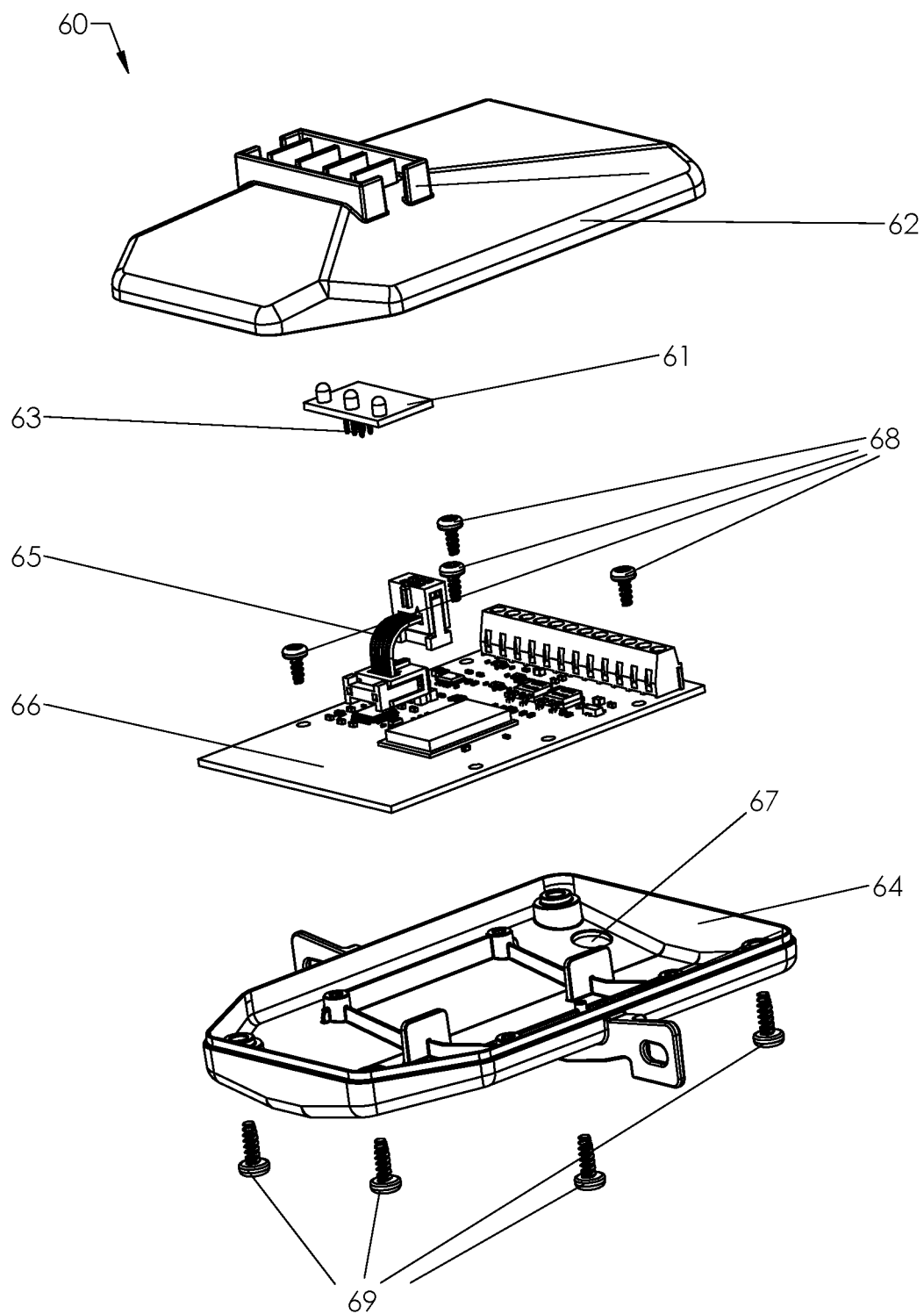
FIG. 16 is an exploded view of a controller/transmitter-receiver assembly.

As seen in FIG. 16, controller/transmitter-receiver assembly 60 comprises enclosure top 62 and enclosure bottom 64. Enclosure top 62 and enclosure bottom 64 house light-emitting diode board 61 having pins 63, which connects to ribbon connector 65 on controller board 66. Enclosure bottom 64 comprises wire port 67. Controller/transmitter-receiver assembly 60 further comprises printed circuit board screws 68 and enclosure screws 69.

Without Controller/transmitter-receiver assembly 60 or sentinels, internal sensors of present invention 10 can also forgo misting (STOP) due to:
1) Low battery,
2) low fluid level, or
3) freezing temperature.

Remote activation is preceded with auto-mix time. Only handle switch activations are excluded from this action. Every auto-mix allows sentinels to report incase conditions require mist-run be curtailed. Following auto-mix cycle, if no curtailments, Controller/transmitter-receiver assembly 60 transmits to all remotes the start verification, reading tank 320, seen in FIG. 14.

As seen in FIG. 17, Present invention 10 further comprises handheld remote control transmitter-receiver 340 that comprises top housing 341, button 342, battery 343, remote control board 344, charge port 345, bottom housing 346, weatherization seal 347, and light-emitting diode (LED) weatherization membrane 348. Light-emitting diode (LED) weatherization membrane 348 is transparent/semi transparent and covers 3 LEDs used to communicate time, fluid levels, and self-preservation alert.

Sealing of handheld remote control transmitter-receiver 340 is achieved by sandwiching weatherization seal 347 between top housing 341 and bottom housing 346. Light-emitting diode (LED) weatherization membrane 348 is illuminated by LEDs below.

When button 342 is depressed first time, present invention 10 comes out of sleep mode indicated by three light-emitting diode light pipes 32 flashing once. Each push afterward adds mist request time in fifteen seconds intervals allowing 15, 30, and 45 seconds, then if button 342 is depressed again within input cycle, it resets time to 0. After a short input cycle time, present invention 10 will go back to sleep or transmit the runtime request.

When present invention 10 receives a run request from handheld remote control transmitter-receiver 340 automatically mix tank 320 for a few seconds prior to executing requested runtime and mirror back to handheld remote control transmitter-receiver 340 (as a start verification) the current tank 320 level.

However, present invention 10 will not mix if is in a self-preservation mode (low battery, low fluid, low temperature). Instead the three light-emitting diode light pipes 32, seen in FIG. 4, will begin flashing. This process will be mirrored back to handheld remote control transmitter-receiver 340 indicating self-preservation is in effect rather than a start verification (tank 320 read).

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A multifunctional misting system, comprising:
   A) a housing assembly comprising first and second flat panels having air inlet holes, a front panel, a rear panel, a top panel, a bottom panel, locking corners, and strap loops, said front panel comprises a blower panel hole, a control panel hole, and a valve threaded neck hole;
   B) a frame assembly comprising a solenoid side frame, a blower side frame and a mix solenoid having a mix tube, said solenoid side frame and said blower side frame each comprises a top wall, first and second lateral stiffeners, and a bottom panel attachment base;
   C) a recessed mist blower assembly comprising a blower having a blower outlet and a blower inlet, a blower motor, first and second blower bases, a recess blower panel, a blower coupling shroud, a blower bezel, a blower shroud flapper, flapper hinge pins, and nozzles, said recessed mist blower assembly is mounted on said blower panel hole;
   D) a valve assembly comprising a valve body, a threaded valve neck, an intake tube, and a valve selector handle, said threaded valve neck with said valve selector handle mounted thereon extends from said valve threaded neck hole;
   E) a recess control panel assembly, said recess control panel assembly is mounted on said control panel hole;
   F) a pump-motor assembly;
   G) a tank assembly comprising a tank having a front side with a puck O-ring groove, said housing assembly houses said frame assembly and said tank assembly;
   H) a puck assembly comprising a puck, an O-ring, a mix connector with a mix orifice, a pickup connector, conductive probe medium, and probe insulations/parallel spacer, said puck assembly is coupled to said tank assembly, whereby said puck O-ring groove receives said puck, and said conductive probe medium and said intake tube is connected to said puck inside said tank;
   I) a handle assembly mounted onto said top panel, and
   J) a controller/transmitter-receiver assembly, said frame assembly secures said controller/transmitter-receiver assembly, said mix solenoid, said recessed mist blower assembly and said pump-motor assembly.

2. The multifunctional misting system set forth in claim 1, further comprising a misting wand assembly.

3. The multifunctional misting system set forth in claim 1, further comprising a handheld remote control transmitter-receiver.

4. The multifunctional misting system set forth in claim 1, further characterized in that said top panel comprises a tank neck hole.

5. The multifunctional misting system set forth in claim 1, further characterized in that said frame assembly further comprises a battery and a battery retainer, and said frame assembly secures said battery.

6. The multifunctional misting system set forth in claim 1, further characterized in that said valve assembly further comprises an adapting elbow, an adapting tee, an elbow adapter, an output tube, a quick connect, outlets, an inlet, a pressure switch, and a pressure switch adapter.

7. The multifunctional misting system set forth in claim 1, further characterized in that said recess control panel assembly comprises a recess control panel, a control bezel, a mix switch, a lighted power switch, and a charge port.

8. The multifunctional misting system set forth in claim 1, further characterized in that said pump-motor assembly comprises a pump motor having a pump housing, said pump housing comprises a pump inlet connector, a pump outlet connector, and a pump base.

9. The multifunctional misting system set forth in claim 8, further characterized in that said pump motor comprises a motor-battery bracket fixed to said pump motor, said motor-battery bracket comprises a battery bracket, a battery side support, and first and second bracket lateral walls.

10. The multifunctional misting system set forth in claim 6, further characterized in that said tank has a front side, lateral sides, a rear side, a bottom side, a top side, a threaded neck, a tank cap with a duckbill vent hole, a tank strainer, and a self locking tank strap.

11. The multifunctional misting system set forth in claim 10, further characterized in that said lateral sides each comprises a strap recess and air gap ribs.

12. The multifunctional misting system set forth in claim 1, further characterized in that said handle assembly comprises a handle body having wire passages, a handle top, grip screw posts, a switch hole, a weep valley, a mist switch with a switch light, and a finger grip.

13. The multifunctional misting system set forth in claim 1, further characterized in that said blower coupling shroud fits into said blower, and said blower coupling shroud houses said blower shroud flapper, which is secured by said recess blower panel.

* * * * *